(12) United States Patent
Liu

(10) Patent No.: US 11,186,121 B2
(45) Date of Patent: Nov. 30, 2021

(54) THREE-LAYER SOFT RUBBER SHOCK ABSORBING WHEEL

(71) Applicant: Zhongshan CASCOO metal machinery co., ltd, Zhongshan (CN)

(72) Inventor: Weiguo Liu, Zhongshan (CN)

(73) Assignee: Zhongshan CASCOO metal machinery co., ltd, Zhongshan (CN)

( * ) Notice: Subject to any disclaimer, the term of this patent is extended or adjusted under 35 U.S.C. 154(b) by 431 days.

(21) Appl. No.: 16/355,874

(22) Filed: Mar. 18, 2019

(65) Prior Publication Data

US 2020/0282771 A1 Sep. 10, 2020

(30) Foreign Application Priority Data

Mar. 4, 2019 (CN) .......................... 201920269112.5

(51) Int. Cl.
*B60C 7/10* (2006.01)
*B60B 3/02* (2006.01)

(52) U.S. Cl.
CPC ............... *B60C 7/102* (2013.01); *B60B 3/02* (2013.01); *B60B 2900/313* (2013.01); *B60B 2900/551* (2013.01)

(58) Field of Classification Search
CPC ..... B60C 7/102; B60B 3/02; B60B 2900/313; B60B 9/10; B60B 21/021; B60B 5/02; A63C 17/22; A63C 17/223
See application file for complete search history.

(56) References Cited

U.S. PATENT DOCUMENTS

| | | | | |
|---|---|---|---|---|
| 2005/0218712 A1* | 10/2005 | Beaumier | ............... | B60C 7/102 301/5.308 |
| 2011/0198007 A1* | 8/2011 | Maeda | ..................... | B60C 7/102 152/302 |
| 2012/0233809 A1* | 9/2012 | Lee | ..................... | B60B 33/0039 16/45 |
| 2014/0246135 A1* | 9/2014 | Andrews | ............... | B29C 39/025 152/310 |

FOREIGN PATENT DOCUMENTS

EP 2671728 A1 * 12/2013 ............. B60C 7/102
WO WO-2017213500 A1 * 12/2017 ............. B60C 7/105

* cited by examiner

*Primary Examiner* — S. Joseph Morano
*Assistant Examiner* — Emily G Castonguay
(74) *Attorney, Agent, or Firm* — Bayramoglu Law Offices LLC

(57) ABSTRACT

A three-layer soft rubber shock absorbing wheel including a hub. An outer surface of the hub is bonded with a hard body, a first layer of tread and a second layer of tread having a hardness lower than that of the first layer of tread. The hard body, the first layer of tread, and the second layer of tread are arranged from inside to outside in sequence. The second layer of tread is bonded in a concave surface portion on an outer surface of the first layer of tread. The first layer of tread and the second layer of tread are both elastic bodies. The hard body is configured to have an I-shaped structure body. The three-layer soft rubber shock absorbing wheel is a wheel body made by bonding three layers of materials with different hardness.

2 Claims, 3 Drawing Sheets

Prior Art

THREE-LAYER SOFT RUBBER SHOCK ABSORBING WHEEL

CROSS REFERENCE TO THE RELATED APPLICATIONS

This application is based upon and claims priority to Chinese Patent Application No. 201920269112.5, filed on Mar. 4, 2019, the entire contents of which are incorporated herein by reference.

TECHNICAL FIELD

The present invention belongs to the technical field of shock absorbing wheels, and in particular relates to a three-layer soft rubber shock absorbing wheel.

BACKGROUND

Ideally, wheel bodies should have small rotational resistance, no noise, shock absorbing and anti-skip properties during use. There are some defects in the prior art (see FIGS. 3-4 in the specification). FIG. 3 of the specification shows a tread of a two-layer wheel structure, which is formed by bonding an inner layer with an outer layer. The inner layer is a hard body, and the outer layer is an elastic body. The tread is usually made of a soft material. During use, if the wheel body is subjected to a pressure of a heavy load, the tread deformation increases, so the rotational resistance increases. If the tread loses elasticity, the shock absorption will fail. FIG. 4 of the specification shows a tread of a one-layer wheel structure which is completely made of the hard body material. When passing through a road with a rough surface, the tread will hit the road surface intermittently, thereby causing a loud noise.

SUMMARY

An objective of the present invention is to provide a three-layer soft rubber shock absorbing wheel to solve the problems set forth in the background described above.

In order to achieve the above objective, the present invention provides the following technical solutions: a three-layer soft rubber shock absorbing wheel includes a hub, and an outer surface of the hub is bonded with a hard body, a first layer of tread and a second layer of tread having a hardness lower than that of the first layer of tread. The hard body, the first layer of tread, and the second layer of tread are arranged from inside to outside in sequence. The second layer of tread is bonded in a concave surface portion on an outer surface of the first layer of tread.

Preferably, the first layer of tread and the second layer of tread are both elastic bodies.

Preferably, the hard body is configured to have an I-shaped structure body.

The technical effects and advantages of the present invention: the three-layer soft rubber shock absorbing wheel is a kind of wheel body that is made by bonding three layers of materials with different hardness. During the use, two layers of soft rubber with different hardness, i.e., the first layer of tread and the second layer of tread, have good effects on shock absorption, muting and anti-skip when subjected to the pressure of either a light load or a heavy load. Meanwhile, the following two problems can be effectively solved. 1. Under the condition where the vehicle is empty or has a light load, when the wheels pass through an uneven ground, or the ground having small bumps and hollows, there must be one of the four wheels getting suspended or landed from time to time. When the suspended wheel is landed, the wheel will continuously hit the ground. In this case, the soft rubber contacts the ground, so the noise generated by the wheel hitting the ground is greatly reduced, and the noise generated by the vehicle itself due to the vibration will be reduced as well. Moreover, the driver will not feel the shock, thereby increasing the comfort during use. When the moving wheels continuously hit the ground, they will rotate continuously, and the soft rubber can reduce the frequency of rotation and improve the service life of the wheels when the wheels are landed. 2. When the load reaches a certain extent, the harder rubber of the first layer of tread and the softer rubber of the second layer of tread are simultaneously landed. Because the soft rubber in the middle will play the role of muting and shock absorption, and the deformation of the harder rubber on both sides is very small, a good supporting force will be provided. Thus, not only the muting is ensured, but also an easy pushing is achieved. 3. The soft elastic body in the middle can achieve a better braking function than the hard elastic body, and the braking is more effective.

In the figures: 1, hub; 2, hard body; 3, the first layer of tread; and 4, the second layer of tread.

DETAILED DESCRIPTION OF THE EMBODIMENTS

The technical solutions in the embodiments of the present invention will be clarified herein after with reference to the accompanying drawings in the embodiments of the present invention. It is apparent that the described embodiments are merely a part of the embodiments of the present invention rather than all. Any other embodiments derived by a person of ordinary skill in the art based on the embodiments of the present invention without creative efforts should be considered as falling within the scope of the present invention.

Figure 1:
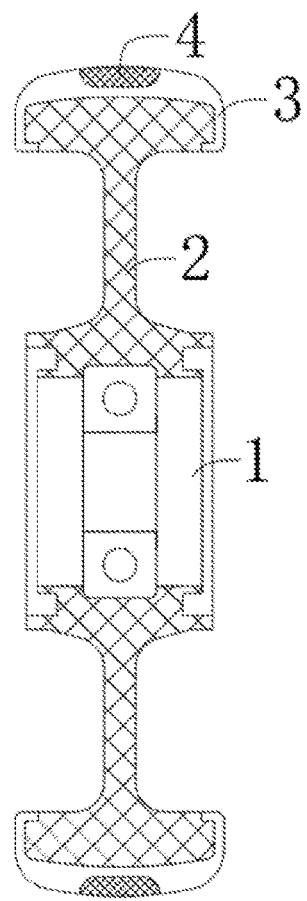
FIG. 1 is a front cross-sectional view of the present invention.
Figure 2:
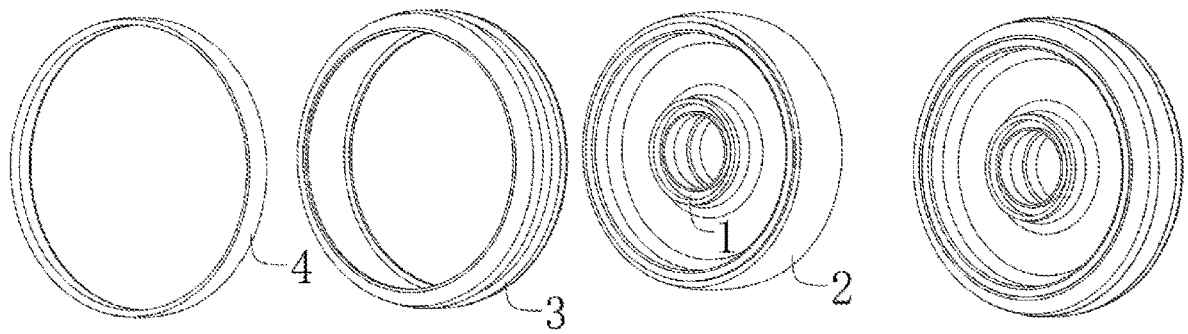
FIG. 2 is an exploded view of the present invention.
Figure 3:
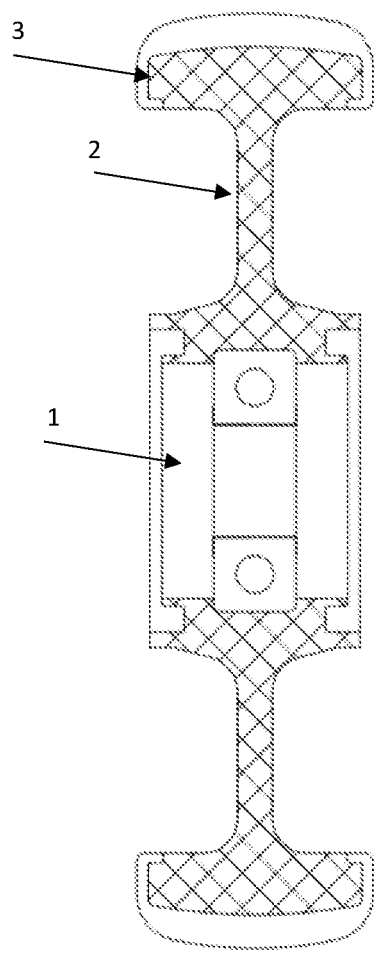
FIG. 3 is a diagram showing a tread of a two-layer wheel body structure described in the background of the present invention.
Figure 4:
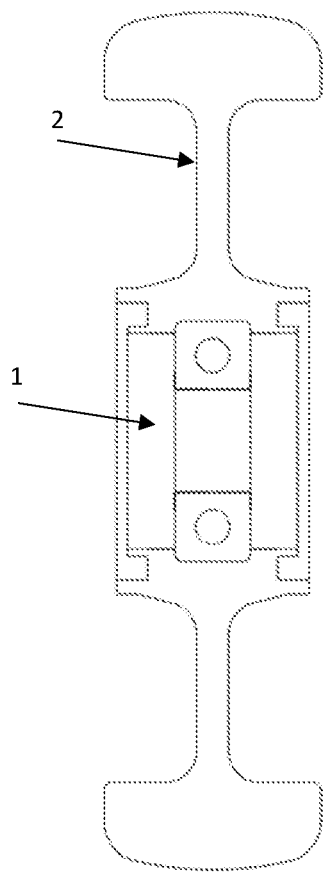
FIG. 4 is a diagram showing a tread of a one-layer wheel body structure described in the background of the present invention.

The present invention provides a three-layer soft rubber shock absorbing wheel as shown in FIGS. 1-2, which includes a hub 1, and an outer surface of the hub 1 is bonded with a hard body 2, a first layer of tread 3, and a second layer of tread 4 having a hardness lower than that of the first layer of tread 3. The hard body 2, the first layer of tread 3, and the second layer of tread 4 are arranged from inside to outside in sequence. The second layer of the tread 4 is bonded in a concave surface portion on an outer surface of the first layer of tread 3.

Specifically, the first layer of tread 3 and the second layer of tread 4 are both elastic bodies, and the hardness of the elastic body of the first layer of tread 3 is greater than that of the elastic body of the second layer of tread 4.

Specifically, the hard body 2 is configured to have an I-shaped structure body with a horizontal flange where the first layer of tread meets the hard body. The hardness of the hard body 2 is greater than the hardness of the first layer of tread 3.

The three-layer soft rubber shock absorbing wheel is a kind of wheel body that is made by bonding three layers of materials with different hardness. During the use, two layers of soft rubber with different hardness, i.e., the first layer of tread and the second layer of tread, have good effects on shock absorption, muting and anti-skip when subjected to the pressure of either a light load or a heavy load. Meanwhile, the following two problems can be effectively solved. 1. Under the condition where the vehicle is empty or has a light load, when the wheels pass through an uneven ground, or the ground having small bumps and hollows, there must be one of the four wheels getting suspended or landed from time to time. When the suspended wheel is landed, the wheel will continuously hit the ground. In this case, the soft rubber contacts the ground, so the noise generated by the wheel hitting the ground is greatly reduced, and the noise generated by the vehicle itself due to the vibration will be reduced as well. Moreover, the driver will not feel the shock, thereby increasing the comfort during use. When the moving wheels continuously hit the ground, they will rotate continuously, and the soft rubber can reduce the frequency of rotation and improve the service life of the wheels when the wheels are landed. 2. When the load reaches a certain extent, the harder rubber and the softer rubber are simultaneously landed. Because the soft rubber of the second layer of tire 4 will play the role of muting and shock absorption, and the deformation of the harder rubber on both sides is very small, a good supporting force will be provided. Thus, not only the muting is ensured, but also an easy pushing is achieved. 3. The soft elastic body in the middle can achieve a better braking function than the hard elastic body, and the braking is more effective.

Finally, it should be noted that the above description is only a preferred embodiment of the present invention and is not intended to limit the present invention. Although the present invention has been described in detail with reference to the foregoing embodiment, those skilled in the art may still modify the technical solutions described in the foregoing embodiment, or make equivalent substitutions of some of the technical features. Any modifications, equivalent substitutions, improvements, etc. made within the spirit and principle of the present invention should also be considered as falling within the scope of the present invention.

What is claimed is:

1. A three-layer soft rubber shock absorbing wheel, comprising: a hub, wherein an outer surface of the hub is bonded with a hard body, a first layer of tread and a second layer of tread having a hardness lower than that of the first layer of tread; the hard body, the first layer of tread, and the second layer of tread are arranged from inside to outside in sequence; and the second layer of tread is bonded in a concave surface portion on an outer surface of the first layer of tread, wherein the hard body is configured to have an I-shaped structure body with a horizontal flange where said first layer of tread meets said hard body, wherein said first layer of tread contacts an underside of said flange.

2. The three-layer soft rubber shock absorbing wheel of claim 1, wherein the first layer of tread and the second layer of tread are both elastic bodies.

* * * * *